Sept. 13, 1949.   A. J. HORNFECK   2,482,065
ANTIHUNT ELECTRIC MOTOR CONTROL SYSTEM
Filed Jan. 28, 1947   2 Sheets-Sheet 2

INVENTOR.
ANTHONY J. HORNFECK
BY
Raymond W. Jenkins
ATTORNEY

Patented Sept. 13, 1949

2,482,065

UNITED STATES PATENT OFFICE 2,482,065

ANTIHUNT ELECTRIC MOTOR CONTROL SYSTEM

Anthony J. Hornfeck, Lyndhurst, Ohio, assignor to Bailey Meter Company, a corporation of Delaware Application January 28, 1947, Serial No. 724,905

6 Claims. (Cl. 318—28)

This invention relates to automatic measuring and control systems, and more particularly to apparatus for preventing hunting in such systems.

Measuring and control systems frequently include means for applying an electromotive force representative of a condition being measured, to a balanceable network which operates when unbalanced to effect an operation of a driving means to rebalance the network. If the electromotive force is directly proportional to any change in the condition and unbalances the network to cause an operation of the driving means, then the driving means may overtravel, due to its inertia, and cause the system to hunt. To prevent such hunting, the system may include apparatus which is actuated by the driving means to reduce the E. M. F. applied to the balanceable network. If the E. M. F. is reduced by an amount which is proportional to the speed of the driving means, it will be seen that a change in the condition will produce an unbalance of the network equal to the change until the driving means starts, and then the unbalance will be reduced. The result is a quick starting of the driving means on unbalance and then a deceleration of the driving means so that the balance condition is reached without overtravel.

A preferred form of my invention applied to the controlling of temperature in a furnace may include a thermocouple responsive to the temperature of the furnace and producing an E. M. F. which is opposed to a selected portion of an E. M. F. across a slide-wire resistance having an adjustable contact. The difference between the E. M. F. of the thermocouple and the E. M. F. across the varying portion of the slide-wire may be applied to a bridge circuit for unbalancing the latter and effecting operation of the motor which positions the adjustable contact of the slide-wire until the E. M. F. across the varying portion of the slide-wire equals the E. M. F. of the thermocouple. In order to prevent overtravel of the motor by reason of its inertia, there may be provided a permanent magnet which is actuated by the motor relative to windings for inducing therein an E. M. F. proportional to the motor speed. The induced E. M. F. may be applied to the bridge supply circuit in opposition to the difference between the E. M. F. of the thermocouple and the slide-wire, or it may be used to regulate the output of apparatus connected into the system between the bridge and the motor for supplying to the system an alternating E. M. F. opposing the output of the bridge and proportional to the speed of the motor.

An object of my invention is to provide improved antihunting apparatus for a measuring or control system. Another object is to provide a balanceable measuring or control system with an improved means for introducing into the system an E. M. F. proportional to the rate at which the network is brought into balance. Yet another object is to provide in a control system having a balanceable network and a motor operating on unbalance of the network to effect a rebalance of the latter, improved means actuated by the motor for introducing into the system an E. M. F. proportional to the speed of the motor.

In the accompanying drawings there are shown two forms which my invention may assume in practice. In this drawing.

Figure 1:
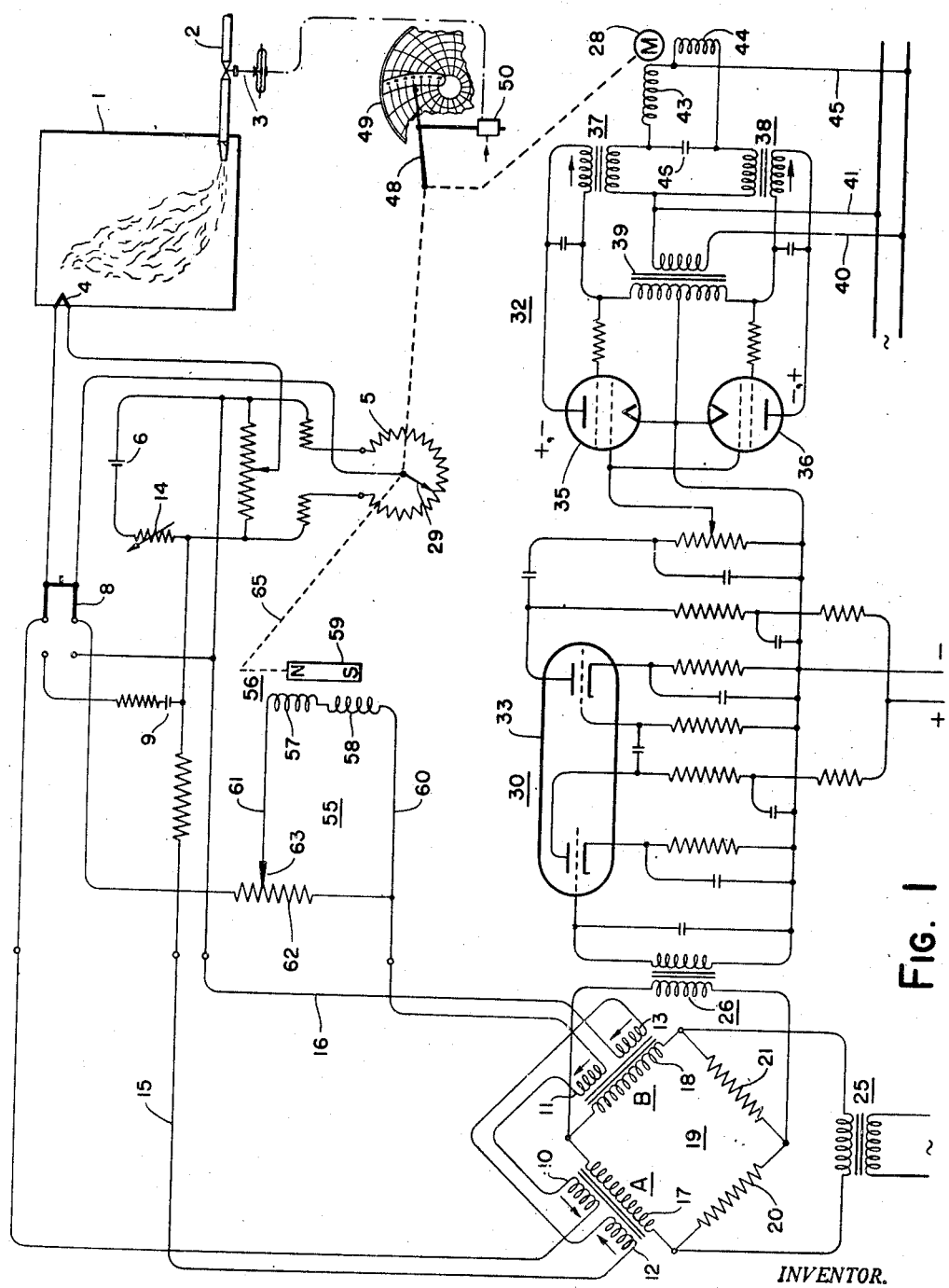
Fig. 1 is a schematic diagram of a measuring and control system in which one form of my invention is incorporated.

Referring to the drawings it will be noted that there is shown in Fig. 1 a system for measuring and regulating the temperature of a furnace 1 to which fuel is supplied through a conduit 2 under the control of a pneumatically actuated valve 3. A thermocouple 4 is arranged in heat transfer relation with the furnace and is connected in a standard potentiometer circuit including a balancing potentiometer resistance 5 and a battery 6. A double-pole double-throw switch 8 is provided for connecting either the thermocouple potentiometer circuit or a standard cell 9 to the input windings 10 and 11 of reactor converters A and B, as shown in Fig. 1. Bias windings 12 and 13 of the reactor converters are connected in series across the battery 6 and an adjustable resistance 14 of the potentiometer circuit by conductors 15 and 16.

The reactor converters have impedance windings 17 and 18 connected in adjacent legs of an A.-C. bridge 19 which has opposite fixed resistance legs 20 and 21. The interaction of the windings 10, 12 of the reactor converter A and of the windings 11, 13 of reactor converter B control the reactance of the windings 17 and 18. As fully disclosed in my copending application Serial No. 544,586, filed July 12, 1944, now Patent No. 2,447,338, dated August 17, 1948, the reactor converters operate to change a low level D.-C. signal of given polarity to a greatly amplified A.-C. signal of given phase, and to reverse the phase of the A.-C. signal 180° when the polarity of the D.-C. signal is reversed.

A transformer 25 has its primary winding connected to a source of alternating current and its secondary winding connected to diagonally opposite points of the bridge. The remaining diagonally opposite points of the bridge are connected to the primary winding of an output transformer 26. When the bridge is in balance, no current will pass to the output transformer, but an unbalance of the bridge will result in an A.-C. output of a phase depending upon the polarity of the D.-C. in the input circuit. In other words, the phase of the A.-C. signal output of the bridge, effective across the primary of the transformer 26, relative to the phase of the alternating current from the input transformer 25, depends upon the polarity of the D.-C. input to the control windings 10 and 11, while the magnitude of the signal supplied to the primary of the transformer 26 depends upon the magnitude of the D.-C. signal applied to the control windings 10 and 11. Current flow through the bridge windings 17 and 18 depend upon the reactance of the windings. The polarity and value of the current flow in the D.-C. windings 10 and 11 is determined by the unbalance of the potentiometer measuring circuit, and the unbalance of this circuit is equal to the change of the thermocouple potential produced by a charge in the temperature within the furnace.

For rebalancing the system I have provided a motor 28 which is operatively connected to the movable contact 29 of the balancing resistance 5. Between the output transformer 26 and the motor 28 is an amplifier 30 and a motor control circuit 32 which act to effect an operation of the motor in one direction or the other to position the contact 29 in a manner to rebalance the system.

The amplifier 30, as shown herein, includes a double triode tube 33 which is connected to the secondary of the output transformer 26 and operates to produce an amplified alternating current varying in phase and intensity in accordance with the variations in phase and intensity of the E. M. F. supplied to it. The output of the amplifier is supplied to tubes 35 and 36 in the control circuit 32 to determine their grid voltages and conductivity. The anodes of the tubes 35 and 36 are connected respectively through windings of saturable core reactors 37 and 38 to opposite ends of the secondary winding of a power transformer 39. The cathodes of the tubes are connected to the mid point of the secondary winding and to one of the output conductors of the amplifier. The primary of the transformer 39 is connected by conductors 40 and 41 to a power line leading from the same source of alternating current used for the input transformer 25 of the bridge 19.

The motor 28 has stator windings 43 and 44 connected at adjacent ends to a conductor 45 leading to one side of the A.-C. power line, and connected at their opposite ends through windings of the saturable core reactors 37 and 38 to the conductor 41 leading to the other side of the power line. Connected between the remote ends of the motor windings is a condenser 46.

When the phase of the amplifier output is the same as the phase of the current in the power line, one of the tubes 35, 36 becomes conductive and permits current to pass through the windings of the saturable core reactor to which it is connected, and when the amplifier output becomes 180° out of phase with the phase of the current in the power line, the other one of the tubes 35, 36 becomes conductive and permits current to pass through a winding of the other saturable core reactor. A flow of current through one winding of a saturable core reactor causes the reactance of its other winding to be reduced. It will therefore be seen that one phase output of the amplifier will result in a flow of current from one side of the power line through the conductor 41, a winding of the reactor 37, the motor winding 43 and the conductor 45 to the other side of the power line. It will also flow through the condenser 46 and the motor winding 44 to the other side of the power line. The condenser will cause the phase of the current in winding 44 to lead that of the current in the winding 43, and the motor will rotate in one direction. A reversal in phase of the amplifier output will cause the portion of the motor control circuit including the reactor 38 and the tube 36 to pass current from the power transformer. The reactance of the output winding of the reactor 38 will then be reduced so that current will flow from the power line directly through the motor winding 44 and the conductor 45 to the other side of the power line. Current will also flow from the winding of the reactor 38 through the condenser 46 and the motor winding 43 to the conductor 45 leading to the other side of the power line. The phase of the current in winding 43 will then lead that of winding 44, and the motor will rotate in the opposite direction. The motor is connected to the contact 29 of the balancing resistance in such a manner that rotation of the motor will position the contact to rebalance the input circuit and reduce to zero the flow of current which unbalances the bridge and causes the motor to operate.

In order to obtain a visual indication of the temperature in the furnace, there may be provided an indicating arm 48 movable over a scale 49 and operatively connected to the motor 28. To control the pneumatically actuated valve 3, a pilot valve 50 may be connected to the arm 48 and actuated by the latter to control the flow of operating fluid to the valve 3 in a manner to regulate the flow of fuel to the furnace for producing the desired temperature.

With nothing more than the structure described above, the flow of current through the motor windings 43 and 44 will be in direct proportion to the value of the E. M. F. imposed upon the bridge by the thermocouple-potentiometer circuit. The operation of the motor by this current flow will be such that it tends to travel beyond the point necessary to reduce the E. M. F. to zero. Overtravel will result in an unbalanced E. M. F. which will cause the motor to rotate in the opposite direction. In order to prevent overtravel, it is proposed that a circuit be provided for introducing into the system between the thermocouple-potentiometer circuit and the bridge, an E. M. F. which is proportional to the speed of the motor and which opposes the E. M. F. of the thermocouple-potentiometer circuit.

In Fig. 1 I have shown a circuit generally designated 55 for producing a voltage which is proportional to the speed of the motor 28 and subjecting this voltage on the bridge supply circuit to oppose the flow of current from the thermocouple-potentiometer circuit.

The circuit 55 includes a solenoid 56 having coils 57 and 58 wound in opposite directions and magnetically coupled to a permanent magnet plunger 59. The coils are connected together at their adjacent ends and are connected at their remote ends by conductors 60 and 61 to one end of a resistance 62 and to an adjustable contact 63 for the resistance. The resistance is connected in the line between the coil 11 and the potentiometer 5 so that the voltage applied to it by the conductors 60, 61 will oppose the flow of current to the bridge from the thermocouple-potentiometer circuit. Operative connections 65 are provided between the motor and the plunger 59 for moving the latter relative to the coils 57, 58 at a speed proportional to the speed of the motor.

As the motor operates and moves the plunger 59 relative to the coils 57 and 58, the flux linkage with one of the coils will be increased while it is decreased with respect to the other coil. Consequently, voltages will be generated in the two coils by reason of this motion, and with the coils connected as shown, the total voltage across the coils will equal the sum of the two voltages generated and will have a polarity depending upon the direction of movement of the plunger. The voltage generated in each coil varies directly with the rate at which the plunger moves and, since the plunger is moved at a speed proportional to the speed of the motor, the voltage applied to the resistance 22 for opposing the flow of current to the bridge from the thermocouple-potentiometer circuit varies in direct proportion to the motor speed.

Figure 2:
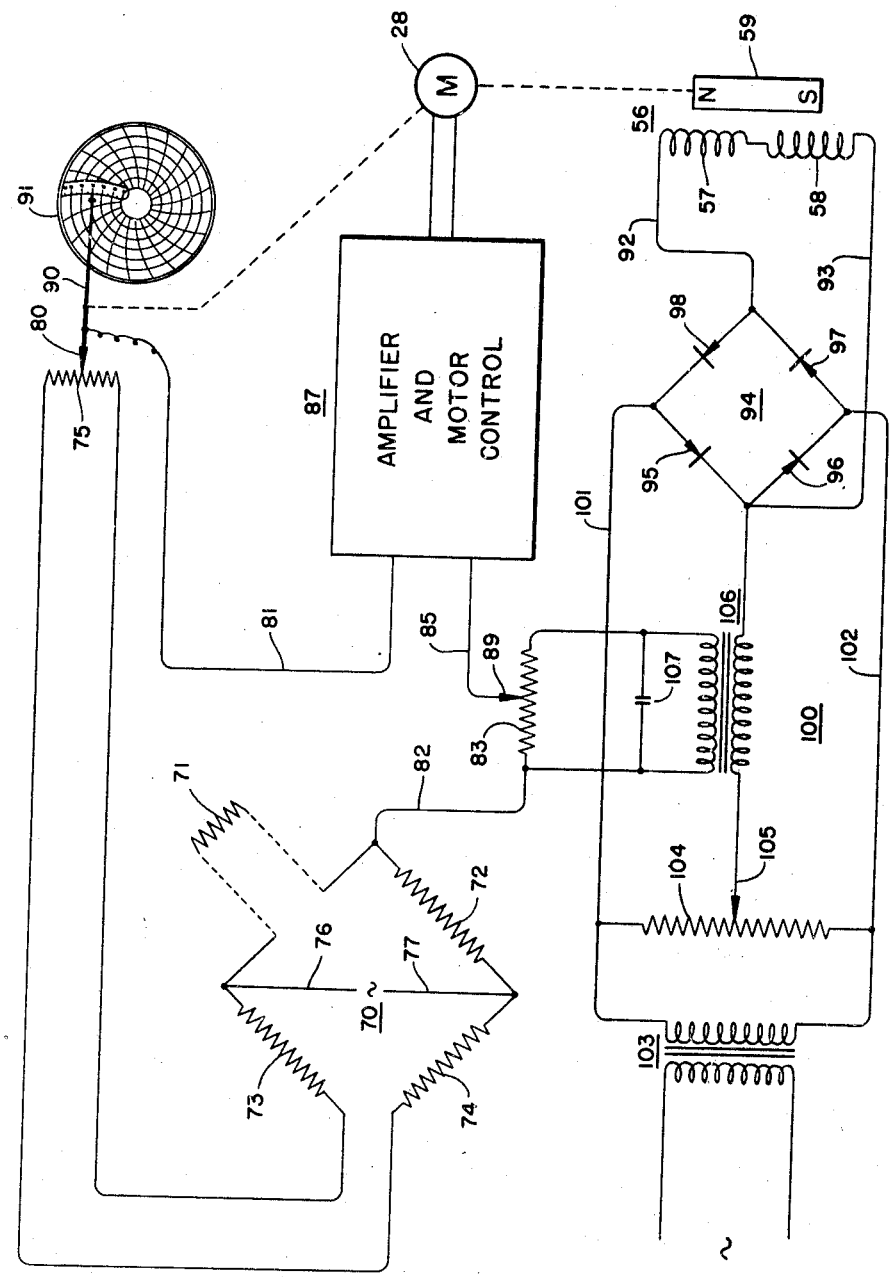
Fig. 2 is a schematic diagram of a system in which another form of my invention is incorporated.

Fig. 2 shows a system including a Wheatstone bridge 70 which has a resistance 71 forming one of its legs and varying in value in accordance with a condition to be measured. A fixed resistance 72 forms an adjacent leg of the bridge, and resistances 73 and 74 combined with portions of a resistance 75 form the opposite adjacent bridge legs. Conductors 76 and 77 connect diagonally opposite points of the bridge to a source of alternating current. An adjustable contact 80 for the resistance 75 is connected to an output conductor 81, and a point on the bridge diagonally opposite from the contact 80 is connected to an output conductor 82. A resistance 83 is connected to the conductor 82 and is provided with an adjustable contact 89 which is connected to a conductor 85. The conductors 81 and 85 lead to an amplifier and motor control circuit 87 which may be the same as that shown in Fig. 1. The motor 28 is operatively connected to the contact 80 and to the permanent magnet plunger 59 of the solenoid 56, as described above in connection with Fig. 1. An operative connection is also provided between the motor and an indicator or pen arm 90 which cooperates with a chart 91 for indicating or recording the value of the condition measured. The coils 57 and 58 of the solenoid 56 are connected by conductors 92 and 93 to diagonally opposite points of a loop 94 containing rectifying elements 95, 96, 97 and 98 which pass current in the same direction, as indicated. This loop forms part of a converter, generally designated 100, which is described and claimed in an application of J. F. English et al., filed January 28, 1947, Serial No. 724,798. Other diagonally opposite points on the loop are connected by conductors 101 and 102 to the secondary of a transformer 103 which has its primary connected to a source of alternating current. A resistance 104 is connected across the secondary of the transformer and is provided with an adjustable contact 105 which is connected through the primary winding of a transformer 106 to the loop, as shown. The secondary winding of the transformer 106 is connected to the ends of the resistance 83 and is shunted by a condenser 107.

When the condition being measured varies and causes a change in the value of the resistance 71, the bridge 70 becomes unbalanced and causes the amplifier and motor control circuit to operate and energize the motor so that it runs in one direction or the other depending upon the direction of unbalance. Operation of the motor causes contact 80 to be moved in a direction to rebalance the bridge, and causes the indicator or pen arm 90 to be moved relative to the chart for indicating or recording the value of the condition measured. The motor also moves the plunger 59 relative to the coils 57 and 58 to subject the loop 94 to a D. C. voltage which is proportional to the speed of the motor. This voltage produces an unbalance of the loop 94 and effects an A. C. output from the transformer 106 proportional to the unbalance. The output of the transformer 106 produces a flow of alternating current in the resistance 83 in phase opposition to the current flow through the conductor 82. It will be seen that an operation of the motor effects a reduction of the unbalance A. C. voltage applied by the bridge 70 to the amplifier and motor control circuit by an amount proportional to the motor speed. This produces a dampening effect on the motor to prevent over-travel and hunting of the latter.

While there are shown two forms which my invention may assume in practice it will be understood that these forms are merely illustrative and that my invention may be modified and embodied in various other forms without departing from its scope or the spirit of the claims.

What I claim as new and desire to secure by Letters Patent of the United States is:

1. A system for measuring an unknown E. M. F. including, in combination, adjustable means for producing a measuring E. M. F. of different values, means for opposing the unknown E. M. F. to said measuring E. M. F., a device operative to adjust said adjustable means, means responsive to the difference between said measuring and unknown E. M. F.'s for controlling the operation of said device, a solenoid having a pair of windings connected in bucking relation and a permanent magnet plunger movable relative to said windings, means operatively connecting said plunger to said device for acuation by the latter, and means for connecting said windings into the system for subjecting induced E. M. F.'s of the windings on the system in opposition to the difference between the measuring and unknown E. M. F.'s and effecting a reduction in the energizing of said device by an amount proportional to the rate at which it is operated.

2. A system for measuring a variable condition including, in combination, a balanceable network, means for subjecting said network to the condition for effecting an unbalance thereof on a variation of the condition, a device energized in response to the unbalance of said network and operative when energized to rebalance the latter, a solenoid having a pair of windings connected in bucking relation and a permanent magnet plunger movable relative to said windings, means operatively connecting said plunger to said device for actuation by the latter, and means for connecting said windings into the system in a manner to oppose the unbalancing of said network by the change in the condition.

3. A system for measuring a variable condition including, in combination, an A.-C. bridge, means for subjecting said bridge to the condition for effecting an unbalance thereof on a variation of the condition, means including a motor for controlling the balance of said bridge, means operative on an unbalance of said bridge for energizing said motor and effecting an operation of the latter in a direction to rebalance said bridge, a solenoid including a winding and a permanent magnet plunger, means operatively connecting said plunger to said motor for actuation by the latter in a manner to induce a D.-C. voltage in said winding, means for producing an A.-C. voltage which is proportional to the voltage induced in said winding, and means for applying the A.-C. voltage to said motor energizing means for opposing the energizing of said motor by an unbalance of said bridge.

4. A system for measuring a variable condition including, in combination, an A.-C. bridge, means for subjecting said bridge to the condition for effecting an unbalance thereof on a variation of the condition, means including a motor for controlling the balance of said bridge, means operative on an unbalance of said bridge for energizing said motor and effecting an operation of the latter in a direction to rebalance said bridge, a solenoid including a pair of windings connected in bucking relation and a permanent magnet plunger, means operatively connecting said plunger to said motor for actuation by the latter in a manner to induce a D.-C. voltage in said windings, means for producing an A.-C. voltage which is proportional to the voltage induced in said windings, said last mentioned means including a closed loop having four rectifying elements connected to pass current in the same direction, means for connecting said windings to diagonally opposite points of said loop, means for subjecting other diagonally opposite points of said loop to a constant A.-C. potential, a resistance connected between said last mentioned points and having an adjustable contact, a transformer having its primary winding connected to said contact and to said loop at a point between said last mentioned diagonal points, and means for connecting the secondary winding of said transformer to said motor energizing means in a manner to oppose the energizing of said motor by an unbalance of said bridge.

5. A system for measuring a variable condition including, in combination, a balanceable bridge adapted to be unbalanced by a variation of the condition, means including a motor for controlling the balance of said bridge, means operative on an unbalance of said bridge for energizing said motor and effecting an operation of the latter in a direction to rebalance said bridge, a solenoid including a pair of windings connected in bucking relation and a permanent magnet plunger, means operatively connecting said plunger to said motor for actuation by the latter in a manner to induce a D.-C. voltage in said windings, and means for opposing the energizating of said motor in proportion to the magnitude of the D.-C. voltage.

6. A system for measuring a variable condition including, in combination, an A.-C. bridge, means for subjecting an element of said bridge to the condition for effecting an unbalance thereof on a variation of the condition, means including a motor for controlling the balance of said bridge, means connected to the bridge output and operative on an unbalance of said bridge for energizing said motor and effecting an operation of the latter in a direction to rebalance the bridge, means actuated by said motor for producing a D.-C. voltage proportional to the motor speed, means for producing an A.-C. voltage which is proportional to said D.-C. voltage, and means for applying the A.-C. voltage to said motor energizing means in a manner to oppose the bridge output.

ANTHONY J. HORNFECK.

REFERENCES CITED

The following references are of record in the file of this patent:

UNITED STATES PATENTS

| Number | Name | Date |
| --- | --- | --- |
| 2,105,598 | Hubbard | Jan. 18, 1938 |
| 2,113,164 | Williams | Apr. 5, 1938 |
| 2,113,436 | Williams | Apr. 5, 1938 |
| 2,414,317 | Middel | Jan. 14, 1947 |

OTHER REFERENCES

Elementary Lessons in Electricity and Magnetism, S. P. Thompson, MacMillan & Co., New York, 1895, pages 210-211.